United States Patent
Loschel et al.

(10) Patent No.: US 11,395,979 B2
(45) Date of Patent: Jul. 26, 2022

(54) CLEANING DEVICE FOR A ROTARY EVAPORATOR

(71) Applicant: Hans Heidolph GmbH, Kelheim (DE)

(72) Inventors: Robert Loschel, Schwabach (DE); Stefan Peters, Schwabach (DE)

(73) Assignee: Hans Heidolph GmbH, Kelheim (DE)

( * ) Notice: Subject to any disclaimer, the term of this patent is extended or adjusted under 35 U.S.C. 154(b) by 0 days.

(21) Appl. No.: 17/058,831

(22) PCT Filed: May 29, 2019

(86) PCT No.: PCT/EP2019/063976
§ 371 (c)(1),
(2) Date: Nov. 25, 2020

(87) PCT Pub. No.: WO2019/229129
PCT Pub. Date: Dec. 5, 2019

(65) Prior Publication Data
US 2021/0205730 A1      Jul. 8, 2021

(30) Foreign Application Priority Data

May 30, 2018   (DE) ............... 20 2018 002 603.4

(51) Int. Cl.
*B01D 3/08*     (2006.01)
*B01D 5/00*     (2006.01)
(Continued)

(52) U.S. Cl.
CPC ........... *B01D 3/085* (2013.01); *B01D 1/0064* (2013.01); *B01D 1/30* (2013.01); *B01D 5/006* (2013.01); *B01D 5/0096* (2013.01); *B01D 3/42* (2013.01)

(58) Field of Classification Search
CPC ........ B01D 1/0064; B01D 1/30; B01D 3/085; B01D 3/42; B01D 5/006; B01D 5/0096
See application file for complete search history.

(56) References Cited

U.S. PATENT DOCUMENTS 3,400,747 A     9/1968   Fritz
4,613,412 A *   9/1986   MacDermid ............. B01D 3/10
                                                134/109
(Continued)

FOREIGN PATENT DOCUMENTS

CN     2 892 229 Y     4/2007
CN     101330950 A    12/2008
(Continued)

OTHER PUBLICATIONS

International Search Report issued in PCT/EP2019/063976, dated May 29, 2019.
(Continued)

*Primary Examiner* — Jonathan Miller
(74) *Attorney, Agent, or Firm* — Locke Lord LLP; Scott D. Wofsy (57) ABSTRACT

Herein, a cleaning device for a rotary evaporator (2) is provided. The rotary evaporator (2) comprises at least a rotatably arranged rotary flask (4) for receiving a substance to be evaporated and a condenser (5) for condensing the evaporated substance during operation of the rotary evaporator (2). The cleaning device (1) comprises at least a supply line (16, 16') for supplying a cleaning agent, a cleaning agent supply (13) for storing the cleaning agent and a pressure generating means (15) for generating a pressure in the cleaning agent in order to supply a pressurized cleaning agent from the cleaning agent supply (13) through the supply line (16, 16') to the rotary flask (4) and/or to the condenser (5).

18 Claims, 3 Drawing Sheets

(51) Int. Cl.
    *B01D 1/00*      (2006.01)
    *B01D 1/30*      (2006.01)
    *B01D 3/42*      (2006.01)

(56) References Cited

U.S. PATENT DOCUMENTS

| | | | | |
|---|---|---|---|---|
| 4,759,825 | A | * | 7/1988 | Medvey ................ B01D 3/085 137/386 |
| 4,780,178 | A | * | 10/1988 | Yoshida ............... B01D 1/0052 159/44 |
| 6,740,206 | B2 | * | 5/2004 | Genser ................ B01D 3/085 122/11 |
| 7,150,807 | B2 | * | 12/2006 | Genser ................ B01D 3/085 159/6.1 |
| 7,153,396 | B2 | * | 12/2006 | Genser ................ B01D 3/085 203/1 |
| 7,931,782 | B2 | * | 4/2011 | Torii ................ B01D 5/009 201/1 |
| 2002/0148718 | A1 | | 10/2002 | Genser |
| 2003/0000651 | A1 | * | 1/2003 | Genser ................ B01D 3/42 159/6.1 |
| 2003/0111185 | A1 | * | 6/2003 | Genser ................ B01D 3/085 159/44 |
| 2004/0099521 | A1 | | 5/2004 | Demers et al. |
| 2007/0102276 | A1 | | 5/2007 | Lubman et al. |
| 2008/0035467 | A1 | * | 2/2008 | Torii ................ B01D 1/02 203/49 |
| 2009/0165653 | A1 | | 7/2009 | Torii et al. |
| 2011/0192710 | A1 | | 8/2011 | Pinhack et al. |
| 2013/0153397 | A1 | * | 6/2013 | Carl ................ B01D 3/108 203/4 |
| 2014/0238620 | A1 | * | 8/2014 | Hauser ................ B01D 1/228 159/11.1 |

FOREIGN PATENT DOCUMENTS

| | | |
|---|---|---|
| CN | 101658740 A | 3/2010 |
| CN | 102186547 A | 9/2011 |
| CN | 204767462 U | 11/2015 |
| CN | 205182223 U | 4/2016 |
| CN | 107530740 A | 1/2018 |
| DE | 12 24 062 B | 9/1966 |
| DE | 44 03 165 A1 | 8/1995 |
| DE | 44 47 235 A1 | 7/1996 |
| DE | 10 2011 121 650 A1 | 6/2013 |
| DE | 20 2017 004 053 U1 | 8/2017 |
| DE | 10 2016 119 645 A1 | 4/2018 |

OTHER PUBLICATIONS

Search Report issued in German Patent Application No. DE 20 2018 002 603.4, dated Feb. 19, 2019.

* cited by examiner

CLEANING DEVICE FOR A ROTARY EVAPORATOR

CROSS-REFERENCE TO RELATED APPLICATIONS

This application is a U.S. National Phase Application filed under 35 U.S.C. § 371, based on International Patent Application No. PCT/EP2019/063976, filed May 29, 2019, which claims priority to German Patent Application No. 20 2018 002 603.4, filed May 30, 2018. The entire contents of these applications is incorporated herein by reference.

The present invention relates to a rotary evaporator and to a cleaning device for a rotary evaporator.

A rotary evaporator comprises a rotary flask for receiving an initial substance that contains the substance to be evaporated. By heating the rotary flask in a heating bath the initial substance is heated and the substance to be evaporated is transferred into the vapor phase. The vapor enters a condenser, where it cools down and condenses.

The resulting distillate is then removed from a collecting container.

Depending on the initial substance used, the filling quantity and the duration of the distillation, in this process residues can deposit on the rotary flask and the condenser, for example, and thus contaminate the rotary flask or the condenser.

DE 44 03 165 A1 discloses a rotary evaporator in which the rotary flask is connected to the condenser via a flexible vapor passage line. For cleaning purposes, the flexible vapor passage line can be removed from the system.

The rotary flask and the condenser themselves are also removed from the system known from the prior art, i.e. disassembled for cleaning. As a result, a cleaning process is time-consuming and requires intervention by the user.

It is therefore an object of the present invention to provide a cleaning device for a rotary evaporator with which it is in particular possible to clean the rotary flask and/or the condenser in a simple manner, in particular without removing it from the rotary evaporator.

The object is achieved by a cleaning device according to claim 1, a rotary evaporator according to claim 9 and a control unit according to claim 10. Further developments of the invention are given in the dependent claims, respectively. The features of the devices, which features are described below and in the dependent claims, can also be used among one another for further development.

The cleaning device according to the invention serves for a rotary evaporator, the rotary evaporator comprising at least a rotatably arranged rotary flask for receiving a substance to be evaporated and a condenser for condensing the evaporated substance during operation of the rotary evaporator. The cleaning device comprises at least a supply line, a cleaning agent supply and a pressure generating means for supplying a pressurized cleaning agent from the cleaning agent supply through the supply line to the rotary flask and/or to the condenser. The rotary flask and/or the condenser are preferably connected to the cleaning agent supply via the supply line and the pressure generating means is preferably configured to generate a pressure in the cleaning agent so that the cleaning agent is supplied via the supply line to the rotary flask and/or condenser.

The cleaning device according to the invention makes it possible, for example, to clean the interior of the rotary flask and/or condenser in situ, i.e. without disassembly. As a result, the rotary evaporator can be used again more quickly and/or can be cleaned with greater efficiency. In addition, cleaning of the rotary flask and of the condenser can be carried out automatically, since no user intervention is required for disassembly.

The purpose of supplying the pressurized cleaning agent is thus to clean the rotary flask and/or the condenser. Preferably, the cleaning device is configured such that it is suitable for carrying out the cleaning of the rotary flask and/or of the condenser, in particular supplying of the cleaning agent, substantially independently of the operation of the rotary evaporator. In particular, the pressure generating means is formed separately from a (vacuum) pump of the rotary evaporator for generating a negative pressure up to a vacuum during operation of the rotary evaporator. "Independent of the operation of the rotary evaporator" here means independent of mechanical and/or electrical components, in particular of a (vacuum) pump, of the rotary evaporator, i.e. the cleaning device is in particular suitable for cleaning the inactive, i.e. not operating, rotary evaporator. Thus, the cleaning device is a device operating actively and independently of the rotary evaporator. The cleaning device can either be fixedly connected to the rotary evaporator or at least specific elements of the cleaning device can be connected to the rotary evaporator prior to the cleaning device being put into operation.

Preferably, the cleaning agent is a liquid, in particular water and/or a low-boiling component (i.e. a highly volatile or low-boiling component that has been evaporated in a previous operation, i.e. evaporation process) used in the operation of the rotary evaporator, and/or a medium selected according to the rule "Similia similibus solvuntur" ("Similar dissolves in similar") and adapted to an initial substance or at least a component of the initial substance used in the operation of the rotary evaporator, and/or a cleaning agent individually tailored to a medium evaporated during operation of the rotary evaporator, i.e. in an evaporation process. Thus, it is preferred that the cleaning agent is adapted to an initial substance used in the operation of the rotary evaporator or adapted to at least one component of the initial substance, in particular a component evaporated during operation. This provides, for example, for a cleaning agent with which the rotary flask and/or the condenser can be cleaned easily. Herein, "in operation of the rotary evaporator" or "evaporation process" means the intended use of the rotary evaporator, such as for a distillation process or the like, in contrast to a cleaning process by means of the cleaning device during which the rotary evaporator is at least partially out of operation. Furthermore, the cleaning agent can also include a maintenance agent and/or water with an added cleaning agent can be used.

Preferably, the pressure generating means is designed as a pump for generating a pressure of the cleaning agent, and the cleaning agent supply is further preferably designed as a storage container for storing the cleaning agent. Alternatively or in addition, it is preferred that at least the cleaning agent supply and further preferably also the pressure generating means is provided by tap water. By means of the pressurized cleaning agent an efficient cleaning can be achieved, for example.

Preferably, the cleaning device further comprises at least one discharge line for discharging the cleaning agent from the rotary flask and/or from the condenser and further comprises a pump for generating a negative pressure in the discharge line, and further preferably the cleaning device comprises a removal container for receiving the discharged cleaning agent. This makes it possible, for example, to discharge the soiled cleaning agent in a simple manner.

Preferably, the cleaning device comprises at least one outlet opening through which the cleaning agent enters into the rotary flask or the condenser during operation of the cleaning device, wherein further preferably a cross-section of the at least one outlet opening is smaller than a cross-section of a supply line. The narrowing of the cross-section in the outlet opening accelerates the cleaning agent passing through it, i.e. the cleaning agent exits at a greater velocity. In this way, for example, a good cleaning effect can be achieved.

Preferably, the cleaning device comprises a plurality of outlet openings, wherein the outlet openings are preferably arranged regularly spaced from one another on the cleaning device and/or wherein the outlet openings are adapted, in particular with respect to their distribution and/or geometric shape, in particular their dimension, to an extension of the rotary flask and/or the condenser. This provides, for example, for a further enhanced cleaning effect.

Preferably, the at least one outlet opening is provided on a nozzle head of the cleaning device and the nozzle head is movably and/or rotatably provided in the rotary flask and/or in the condenser, and/or the nozzle head can be set into vibrations, in particular ultrasonic vibrations. This makes it possible, for example, to clean the rotary flask and/or the condenser even better, since in particular the jets of cleaning agent exiting through the outlet openings can be directed to different regions of the respective container by a movement and/or rotation of the nozzle head. By additionally setting the nozzle head into vibrations, e.g. into ultrasonic vibrations, residues and/or contaminations on the inner wall of the respective container can be removed even better, for example.

Preferably, the cleaning device further is suitable for supplying compressed air to the rotary flask and/or the condenser. Thus, for example, after cleaning the flask or condenser, it can be dried with compressed air so that the rotary evaporator can be used again more quickly and/or residues can be removed from the flask or condenser already before cleaning, which simplifies the cleaning process, for example.

A rotary evaporator according to the invention comprises at least a rotatably arranged rotary flask for receiving a substance to be evaporated and a condenser for condensing the evaporated substance during operation, as well as a cleaning device described above. Preferably, the cleaning device is provided as an equipment and/or retrofit kit for the rotary evaporator.

A control unit according to the invention serves for a cleaning device according to the invention as described above and/or for a rotary evaporator according to the invention as described above, wherein the control unit is configured to control the cleaning device or the rotary evaporator so that during operation of the cleaning device, and in particular independent of the operation of the rotary evaporator, a pressurized cleaning agent is supplied to the rotary flask and/or to the condenser from the cleaning agent supply through the supply line by means of the pressure generating means in order to clean the rotary flask and/or the condenser. With such a control unit it is possible, for example, to automatically carry out a cleaning process on the rotary evaporator.

An inventive cleaning method for a rotary evaporator serves to clean a rotary flask and/or a condenser of the rotary evaporator. In the method a pressurized cleaning agent is supplied to the rotary flask and/or the condenser from a cleaning agent supply through a supply line by means of a pressure generating means, preferably independently of the operation of the rotary evaporator.

The cleaning method according to the invention can also be further developed by the features of the cleaning device and/or of the rotary evaporator and/or of the control unit, which features are given above and in the dependent claims.

Further features and expediencies of the invention become apparent from the description of exemplary embodiments with reference to the accompanying drawings.

A rotary evaporator 2 with a cleaning device 1 according to an embodiment of the present invention is described below with reference to FIG. 1.

The rotary evaporator 2 comprises a rotary flask 4 for receiving an initial substance, the rotary flask being arranged in a heating bath 3 and being rotatable about an axis of rotation by means of a rotary drive 7. For example, the rotary flask 4 can be designed as a round-bottom flask made of glass. The heating bath 3 contains a heatable liquid, such as water or oil.

A vapor path is formed by a vapor passage 8 through the rotary drive 7 and a condenser 5. A collecting container and/or distillate removal container 6 for receiving and/or removing liquefied distillate is provided below the condenser 5. The rotary flask 4, the condenser 5 and the collecting container 6, together with the elements arranged in the vapor path between them, preferably form a gastight sealed system.

The rotary evaporator 2 further comprises an operating unit 12 for controlling the individual components of the rotary evaporator 2.

Figure 1:
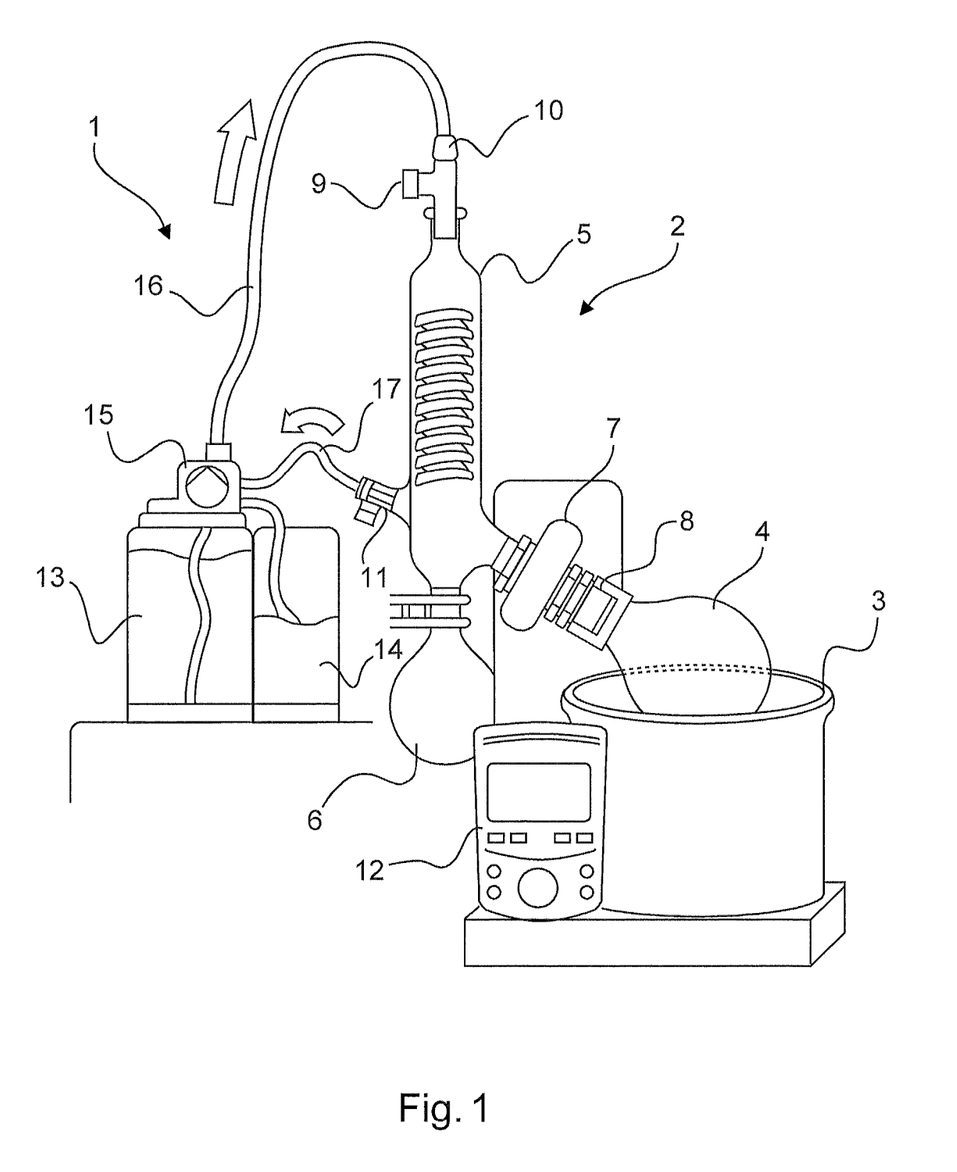
FIG. 1 shows a schematic view of a rotary evaporator with a cleaning device according to an embodiment of the present invention.

The condenser 5 has a vacuum connection 9 for connecting a vacuum pump, not shown in FIG. 1, for generating a negative pressure up to a vacuum, as well as coolant connections, also not shown in FIG. 1, for supplying and discharging a cooling agent. Furthermore, the condenser 5 preferably has at its upper portion a connection 10 for supplying a cleaning agent and preferably has at its lower portion a connection 11 for discharging the cleaning agent.

The cleaning device 1 shown in FIG. 1 comprises a cleaning agent supply in the form of a storage container 13 for storing a cleaning agent, the storage container being connected to the upper portion of the condenser 5 via a supply line 16 and the connection 10 of the condenser 5. The cleaning device 1 further comprises a removal container 14 which is connected to the lower portion of the condenser 5 via a discharge line 17 and the connection 11 of the condenser 5.

Preferably, the cleaning agent is a cleaning liquid, for example water or a cleaning agent adapted to an initial substance used in operation of the rotary evaporator or adapted to at least one component, in particular a component that evaporates during operation, of the initial substance. A maintenance agent can also be added to the cleaning agent or water with an added cleaning agent can be used.

The cleaning device 1 further comprises a pressure generating means designed as a compressor 15. The compressor 15 is configured to allow the pressurized cleaning agent to flow from the storage container 13 through the supply line 16 towards the condenser 5 and to generate a negative pressure in the discharge line 17 and thus to remove the cleaning agent again from the lower portion of the condenser 5 by suctioning. As an alternative to the compressor 15, separate pumps for generating a pressure in the cleaning agent in the supply line 16 and for generating a negative pressure in the discharge line 17 can also be provided.

Preferably, the compressor 15 is electronically connected to the operating unit 12 for controlling the compressor 15 via the operating unit 12.

During operation of the rotary evaporator 2 the temperature of the heating bath 3, the speed of rotation of the rotary flask 4 and a negative pressure in the rotary flask 4 are controlled by means of the operating unit 12 in such a way that a desired component of the initial substance contained in the rotary flask 4 or the entire initial substance evaporates. Via the vapor passage 8, the evaporated distillate reaches the condenser 5 where it is cooled and condenses. The liquefied distillate flows into the collecting container 6 and can then be removed.

After one or more evaporation processes, the rotary flask 4 and the condenser 5 are cleaned. For this purpose, the rotary evaporator is substantially out of operation, i.e. in particular the rotary container 4 and the collecting container 6 are essentially emptied apart from remains and/or residues. The heating bath 3 is preferably also switched off. The rotary drive 7 and/or the vacuum pump for generating a negative pressure can also be switched off.

By switching on the compressor 15, cleaning agent is supplied under pressure from the storage container 13 through the supply line 16 to the upper portion of the condenser 5. Due to the pressure of the cleaning agent and the gravity acting on the cleaning agent, the cleaning agent flows downwards through the condenser 5 and through the vapor passage 8 into the rotary flask 4. As a result, impurities and residues detach from the inner walls of the condenser 5, the vapor passage 8 and the rotary flask 4 and are absorbed in the cleaning agent. In doing so, rotation of the rotary flask 4 can increase the cleaning effect.

Subsequently, by applying a negative pressure by means of the compressor 15, the soiled cleaning agent is sucked off through the discharge line 17 so that it flows from the rotary flask 4 and the lower portion of the condenser 5 through the discharge line 17 into the removal container 14.

The cleaning process can be continuous, i.e. the supply of cleaning agent through the supply line 16 and the suctioning of the soiled cleaning agent through the discharge line 17 take place simultaneously at least temporarily. Alternatively, an amount of the cleaning agent can first be introduced into the condenser 5 and the rotary flask 4 and this cleaning agent can then be sucked off without new cleaning agent being supplied during the sucking off.

In doing so, the cleaning device is preferably controlled by controlling the compressor 15, and optionally by controlling valves optionally provided on the supply line 16 and/or the discharge line 17. These valves (not shown in the figures) can be suitable for shutting off and opening the respective line and/or controlling the flow rate of the cleaning agent through the respective line.

The control of the compressor 15 and the optional valves can take place manually by a user, either on the compressor and the valves themselves or via the operating unit 12, or automatically. For example, the cleaning process can take place automatically after one or more distillation processes. For the automatic control of the compressor 15 and the optional valves, as well as possibly of further components of the rotary evaporator 2, the operating unit 12 is designed, for example, as a control unit. The control unit can contain a CPU, the operation of which is controlled by a computer program (software).

For sucking off the soiled cleaning agent, the discharge line 17 can also pass through the connection 11 of the condenser 5 into the rotary flask 4. Preferably, the discharge line 17 extends substantially to the bottom of the rotary flask 4, i.e. its lowest point, in order to be able to discharge a significant portion of the cleaning agent, preferably all of the cleaning agent, from the rotary flask 4.

As an alternative to the storage container 13, the supply line 16 can also be connected to a water tap, so that tap water as a cleaning agent passes through the supply line 16. If the pressure of the tap water is sufficient, the supply line 16 can also be provided without the compressor 15. The tap water flowing out of the tap thus serves both as a cleaning agent supply and as a pressure generating means. Cleaning and/or maintenance agents can also be added to the tap water.

Figure 2:
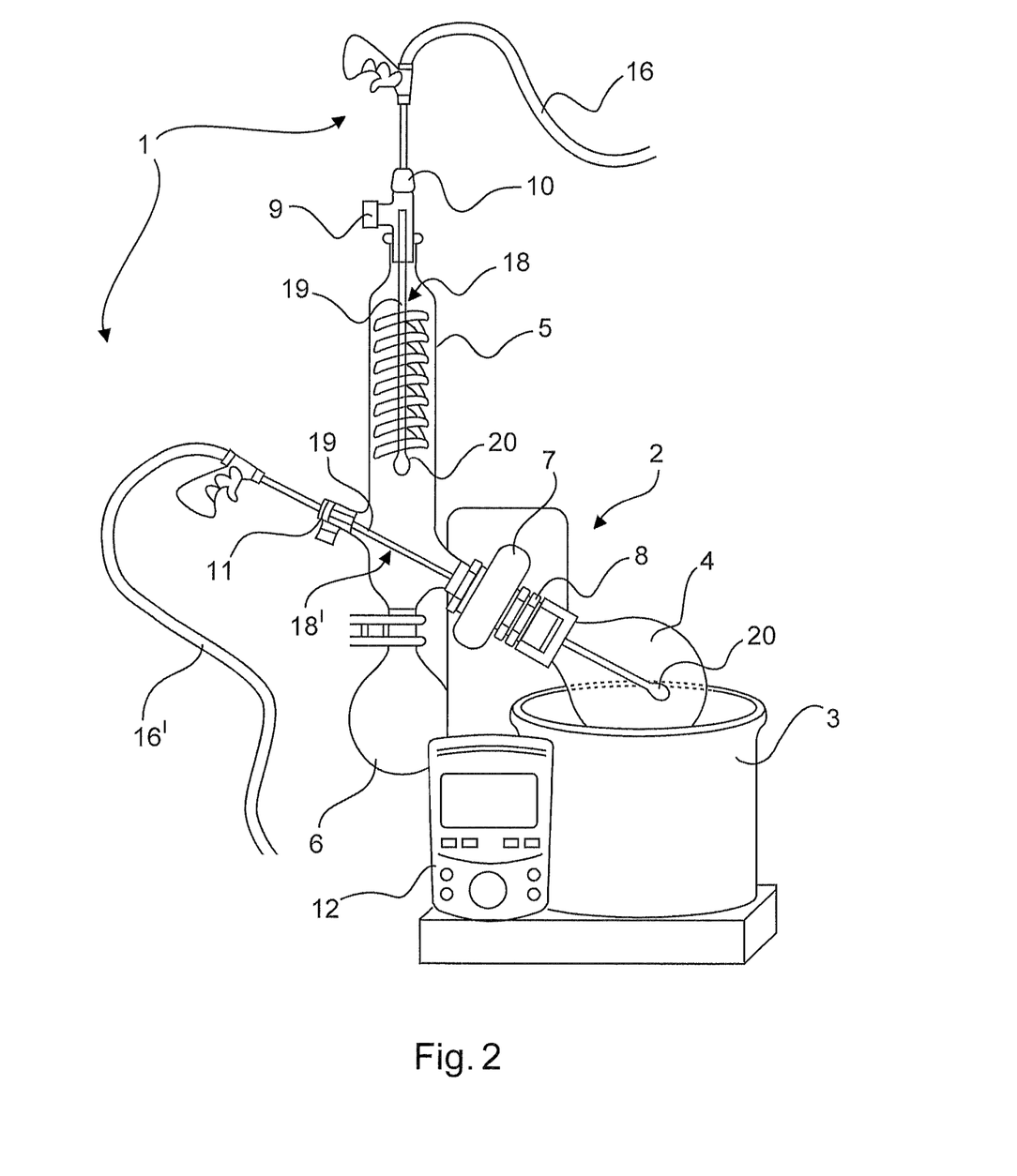
FIG. 2 shows a schematic view of a rotary evaporator with a section of a cleaning device according to a further development of the cleaning device shown in FIG. 1.

FIG. 2 shows the rotary evaporator 2 shown in FIG. 1 with a further development of the cleaning device 1 shown in FIG. 1. For the sake of simplification, the storage container 13, the removal container 14 and the compressor 15 are not shown in FIG. 2. The discharge line 17 is also not shown.

The cleaning device 1 shown in FIG. 2 comprises two supply lines 16, 16' that are connected to the compressor 15 (not shown) and the storage container 13 (also not shown) or alternatively to a water tap. The supply lines 16, 16' are connected to a cleaning lance 18, 18' each, each cleaning lance having a line portion 19 and a nozzle head 20. The line portion 19 of the cleaning lances 18, 18' is, for example, a tubular, rigid hollow body that is suitable for guiding the pressurized cleaning agent from the supply line 16, 16' to the nozzle head 20. In FIG. 2, the line portions 19 of the cleaning lances 18, 18' pass through the connections 10 and 11 into the condenser 5 and into the rotary flask 4, respectively.

The cleaning lances 18, 18' are preferably movable in an axial direction (i.e. along the longitudinal axis of the line portions 19) and/or in a radial direction (i.e. perpendicular to the longitudinal axis of the line portions 19) within the condenser 5 or within the rotary flask 4 and/or are provided to be rotatable about their longitudinal axis within the condenser 5 or the rotary flask 4 and/or the nozzle head 20 is rotatably arranged on the line portion 19.

Figure 3A:
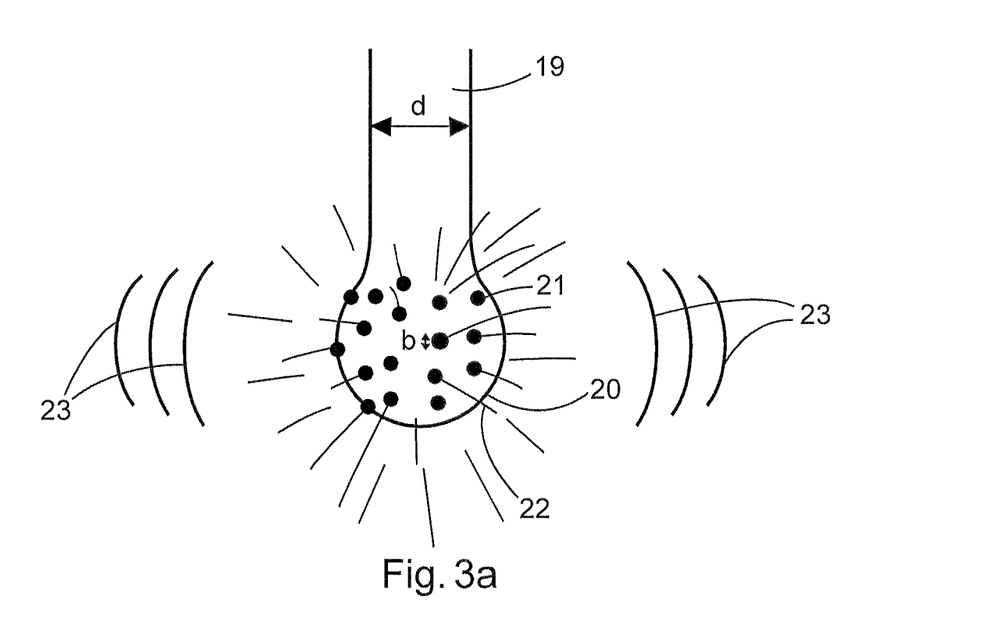
FIGS. 3a and 3b show schematic views of exemplary embodiments of a nozzle head for use in the cleaning device shown in FIG. 2.

FIG. 3a shows a first exemplary embodiment of the nozzle head 20 of the cleaning lance 18, 18' that adjoins the line portion 19. The nozzle head is designed as a spherical cavity and comprises a plurality of outlet openings 21 preferably being regularly spaced from one another through which openings the cleaning agent passes as cleaning agent jets 22 into the rotary flask 4 or the condenser 5 when the cleaning device 1 is in operation. The outlet openings 21 are, for example, circular holes in the nozzle head 20 with a diameter b, the diameter b of the holes preferably being set to be smaller than a diameter d of the line portion 19. The total area of all the outlet openings 21 of the nozzle head 20 is preferably smaller than the cross-sectional area of the line portion 19. This provides for the cleaning agent exiting the outlet openings 21 at high speed, in particular with a velocity higher than the cleaning agent flowing through the line portion 19.

In operation of the cleaning device 1 shown in FIGS. 2 and 3a, the pressurized cleaning agent flows through the supply line 16 or 16' and the respective line portion 19 of the cleaning lance 18 or 18' and then arrives in the nozzle head where it passes at high speed through the outlet openings 21 as cleaning agent jets 22. In accordance with the regular arrangement of the outlet openings 21 on the nozzle head 20, the cleaning agent emerges substantially in all spatial directions (except in the direction of the line portion 19). Meanwhile, the cleaning lance 18, 18' is optionally moved in the axial and/or radial direction within the condenser 5 or the rotary flask 4 and/or at least the nozzle head is rotated around the longitudinal axis of the line portion 19, so that as far as possible all regions of the inner wall of the condenser 5 or of the rotary flask 4 are scanned by the cleaning agent jets 22.

Then, as described with reference to FIG. 1, the soiled cleaning agent is sucked out of the rotary flask 4 and the condenser 5 through a discharge line (not shown in FIG. 2) by means of a negative pressure. As described with reference to FIG. 1 the discharge line can be a discharge line provided separately from the cleaning lance 18, 18' and connected to a connection of the condenser and/or passing through a connection of the condenser into the rotary flask. Alternatively, the discharge line can also be formed integrally with the cleaning lance 18, 18', for example, a further line portion for discharging the cleaning agent can be provided next to and parallel to the line portion 19.

As described above with reference to FIG. 1 the cleaning process can take place continuously or by the cleaning agent being supplied and discharged in a manner alternating in time. The cleaning device shown in FIG. 2 is also controlled manually or automatically, as described with reference to FIG. 1, by controlling the compressor 15 and optional valves at the supply lines and/or discharge lines.

FIG. 2 shows two cleaning lances 18, 18' that are inserted in the condenser 5 and the rotary flask 4, respectively. The condenser 5 and the rotary flask 4 can thus be cleaned at the same time (by operating the two cleaning lances at the same time). Alternatively, the cleaning lances 18, 18' can also be operated one after the other so that essentially first the condenser 5 and then the rotary flask 4 is cleaned or vice versa. In the case of successive cleaning, it is also possible to provide only one cleaning lance which is first introduced into the condenser 5 and then into the rotary flask 4 or vice versa. Furthermore, the cleaning lance(s) 18, 18' can be provided as integral components of the rotary evaporator 2 so that they do not need to be introduced into the rotary evaporator in order to carry out the cleaning process. Alternatively, the cleaning lance(s) 18, 18' can be provided separately from the rotary evaporator 2 and can be introduced into the rotary evaporator for a cleaning process.

In the spherical nozzle head 20 shown in FIG. 3*a* the outlet openings 21 are arranged regularly spaced from one another, with the exception of the region in which the line portion 19 and the nozzle head 20 are connected. However, the arrangement of the outlet openings 21 on the nozzle head can also deviate from this arrangement, for example, the outlet openings can be distributed irregularly on the nozzle head at least in a section thereof. In addition, the shape of the outlet openings 21 can also differ from the circular shape shown in FIG. 3*a*. They can assume any shape, in particular outlet openings 21 with differing geometric shapes and/or sizes can also be provided on the nozzle head 20. It is preferred that the distribution and/or geometric shape, in particular the size (i.e. dimensions), of the outlet openings 21 is adapted to a geometric shape and/or extension of the rotary flask 4 or the condenser 5. The nozzle head 20 can also deviate from the spherical shape shown in FIG. 3*a*, for example, it can be designed to be elongate.

Figure 3B:
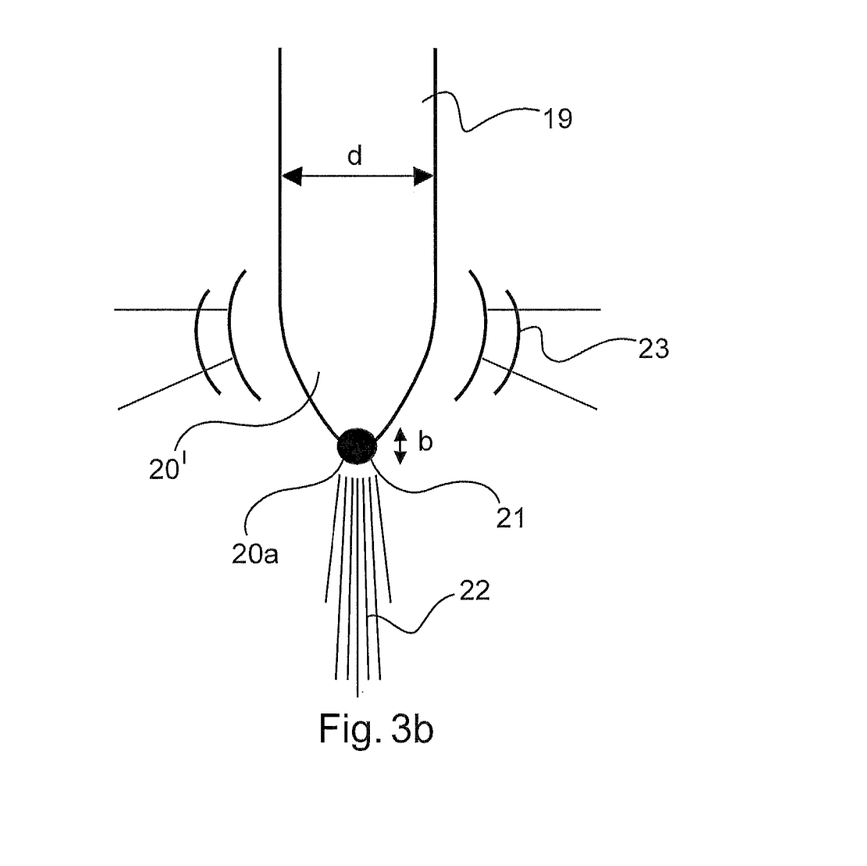

FIG. 3*b* shows a second exemplary embodiment of a nozzle head 20' of a cleaning lance 18, 18'. The nozzle head 20' is designed as an extension of the line portion 19 with a preferably continuously decreasing cross-sectional area. An outlet opening 21 is provided at the tapering end 20*a* of the nozzle head 20' from which outlet opening the cleaning agent emerges as a cleaning agent jet 22 during operation. The outlet opening 21 thus has a smaller cross-sectional area than the line portion 19. FIG. 3*b* shows a circular outlet opening 21, the diameter b of which is smaller than the diameter d of the line portion 19.

In operation, the cleaning agent exits the nozzle head 20' from the outlet opening 21 substantially downwards, i.e. in the direction of the longitudinal axis of the line portion 19. It is thus possible to direct the cleaning agent jet 22 exiting at high speed to a fixedly defined position in the evaporator 5 or the rotary flask 4. As described with reference to FIG. 3*a*, during the cleaning agent discharge, optionally the cleaning lance with the nozzle head 20' is moved in axial direction and/or at least the nozzle head is rotated and/or pivoted (i.e. at an angle to the longitudinal axis of the line portion 19) around the longitudinal axis of the line portion 19, so that as far as possible all regions of the inner wall of the condenser 5 or the rotary flask 4 can be scanned by the cleaning agent jet 22.

In the nozzle head 20' shown in FIG. 3*b* the outlet opening 21 is provided at the lower end of the nozzle head, i.e. in extension of the line portion 19. Alternatively, the outlet opening can also be provided at a different position of the nozzle head 20', for example at its side. In this case the cleaning agent jet 22 exits laterally and/or downwards at an angle. Moreover, FIG. 3*b* shows a nozzle head 20' with a single outlet opening 21, but the nozzle head can also have several outlet openings, as shown in FIG. 3*a*. The outlet opening 22 can also deviate from the circular shape described. Preferably the geometric shape, in particular size (i.e. dimension), of the outlet opening 21 is adapted to a geometric shape and/or extension of the rotary flask 4 or the condenser 5.

Optionally, the nozzle head shown in FIG. 3*a* and/or FIG. 3*b* can be set into ultrasonic vibrations, which is illustrated in the figures by lines 23. Thus, ultrasound spreads in the cleaning agent jets and the vibrating cleaning agent arrives at the container wall which can further improve the cleaning effect.

Optionally, after suction of the cleaning agent compressed air can be introduced into the rotary flask 4 and/or the condenser 5 by means of the cleaning device 1. For this purpose, instead of the storage container 13 a source of compressed air is connected to the supply line 16 or 16' or to a separately provided compressed air line of the cleaning device 1, wherein, for example, the air can escape again from the rotary flask 4 or the condenser 5 through the discharge line 17. The compressed air can displace the cleaning agent that remains in the condenser 5 and/or the rotary flask 4 therefrom, which causes drying of the condenser 5 and/or of the rotary flask 4. Preferably, introduction of compressed air takes place automatically, for example by controlling valves provided at the supply line by means of a control unit.

Introduction of compressed air can also take place before a cleaning process, for example in order to remove residues of the initial substance and/or of the distillate from the rotary flask and/or the condenser.

The supply line 16, 16' and the discharge line 17 are preferably fixedly connected to the respective connections 10, 11 of the condenser 5. Alternatively, the supply and discharge lines can only be connected to the respective connections of the condenser prior to the start of the cleaning process. The supply line 16, 16' can also be a line already provided on the rotary evaporator or a line connected to such a line, such as a line for filling the rotary flask. The discharge line can also be a line already provided on the rotary evaporator or a line connected to such a line, such as a line for emptying residues of the initial substances. Moreover, suitable valves, in particular directional control valves, can be provided for controlling the cleaning process.

In the further development described above with respect to FIGS. 2, 3a and 3b, one cleaning lance is provided for the condenser and/or the rotary flask each. However, it is also possible to provide several cleaning lances (or alternatively one cleaning lance with several nozzle heads) in the condenser and/or the rotary flask at the same time. In particular in the case of the nozzle head with a single outlet opening shown in FIG. 3b an improved cleaning effect can be achieved by providing several cleaning lances or nozzle heads. In doing so, the line portions of the cleaning lances or nozzle heads pass through a connection of the condenser preferably regularly spaced from one another at a distance to the center of the respective connection. In contrast, when using a single cleaning lance or a single nozzle head (which is particularly advantageous in the case of a cleaning lance with a nozzle head shown in FIG. 3a) the line portion of the cleaning lance preferably passes centrally through the respective connection of the condenser.

The cleaning device 1 can be formed integrally with the rotary evaporator 2 or it can be provided separately from the rotary evaporator 2 as an equipment or retrofit kit for the rotary evaporator.

The invention claimed is:

1. A cleaning device for a rotary evaporator, the rotary evaporator comprising:
   at least a rotatably arranged rotary flask for receiving a substance to be evaporated; and
   a condenser for condensing the evaporated substance during operation of the rotary evaporator; and
   wherein the cleaning device includes:
   at least a supply line for supplying a cleaning agent;
   a cleaning agent supply for storing the cleaning agent; and
   a pressure generating device for generating a pressure in the cleaning agent in order to supply a pressurized cleaning agent from the cleaning agent supply through the supply line to the rotary flask and/or to the condenser, and wherein the cleaning device is adapted to supply the cleaning agent to the rotary evaporator independently of the operation of the rotary evaporator.

2. The cleaning device of claim 1, wherein the cleaning agent is a liquid.

3. The cleaning device of claim 2, wherein the cleaning agent includes water and/or a cleaning agent adapted to an initial substance used in the operation of the rotary evaporator or adapted to at least one component of the initial substance or to a component evaporated during operation.

4. The cleaning device of claim 1, wherein the pressure generating device comprises a pump and the cleaning agent supply is a storage container and/or wherein at least the cleaning agent supply and also the pressure generating device is provided by tap water.

5. The cleaning device of claim 1, wherein the cleaning device further comprises at least one discharge line for discharging the cleaning agent from the rotary flask and/or the condenser, and a pump for generating a negative pressure in the discharge line.

6. The cleaning device of claim 5, further comprising a removal container for receiving the discharged cleaning agent.

7. The cleaning device of claim 1, comprising at least one outlet opening through which the cleaning agent enters into the rotary flask or the condenser during operation of the cleaning device.

8. The cleaning device of claim 7, comprising a plurality of outlet openings.

9. The cleaning device of claim 8, wherein the outlet openings are arranged regularly spaced from one another on the cleaning device and/or wherein the outlet openings are adapted to an extension of the rotary flask and/or the condenser.

10. The cleaning device of claim 7, wherein the at least one outlet opening is provided on a nozzle head of the cleaning device and the nozzle head is movably and/or rotatably provided in the—rotary evaporator.

11. The cleaning device of claim 7, wherein a cross-section of the at least one outlet opening is smaller than a cross-section of the supply line.

12. The cleaning device if claim 7, wherein the nozzle head can be set into vibrations or ultrasonic vibrations.

13. The cleaning device of claim 1, wherein the cleaning device is further adapted to supply compressed air to the rotary flask and/or the condenser.

14. A rotary evaporator, comprising:
   at least a rotatably arranged rotary flask for receiving a substance to be evaporated; and
   a condenser for condensing the evaporated substance during operation, as well as a cleaning device according to claim 1.

15. The rotary evaporator of claim 14, wherein the cleaning device is provided as an equipment kit and/or retrofit kit for the rotary evaporator.

16. A control unit for a cleaning device according to claim 1 and/or for a rotary evaporator comprising:
   at least a rotatably arranged rotary flask for receiving a substance to be evaporated; and
   a condenser for condensing the evaporated substance during operation, as well as a cleaning device according to claim 1, wherein the control unit is configured to control the cleaning device or the rotary evaporator so that during operation of the cleaning device the pressurized cleaning agent is supplied to the rotary flask and/or the condenser from the cleaning agent supply through the supply line by means of the pressure generating device, and wherein the cleaning agent is supplied independently of the operation of the rotary evaporator.

17. A method for cleaning a rotary flask and/or a condenser of a rotary evaporator,
   wherein the rotary flask is designed to receive a substance to be evaporated and is rotatably arranged on the rotary evaporator, and
   the condenser is configured to condense the evaporated substance during operation of the rotary evaporator
   wherein in the method a pressurized cleaning agent is supplied to the rotary flask and/or the condenser from a cleaning agent supply through a supply line by means of a pressure generating device, and
   wherein the cleaning agent is supplied independently of the operation of the rotary evaporator.

18. A cleaning device for a rotary evaporator, the rotary evaporator comprising:
   at least a rotatably arranged rotary flask for receiving a substance to be evaporated; and
   a condenser for condensing the evaporated substance during operation of the rotary evaporator; and wherein the cleaning device comprises at least a supply line for supplying a cleaning agent;

a cleaning agent supply for storing the cleaning agent; and a pressure generating device for generating a pressure in the cleaning agent in order to supply a pressurized cleaning agent supply through the supply line to the rotary flask and/or the condenser, wherein the cleaning device is further adapted to supply compressed air to the rotary flask and/or the condenser.

* * * * *